(No Model.)
F. W. HARDWICK.
PROCESS OF MANUFACTURING TIRES OR OTHER RUBBER GOODS.
No. 534,792. Patented Feb. 26, 1895.
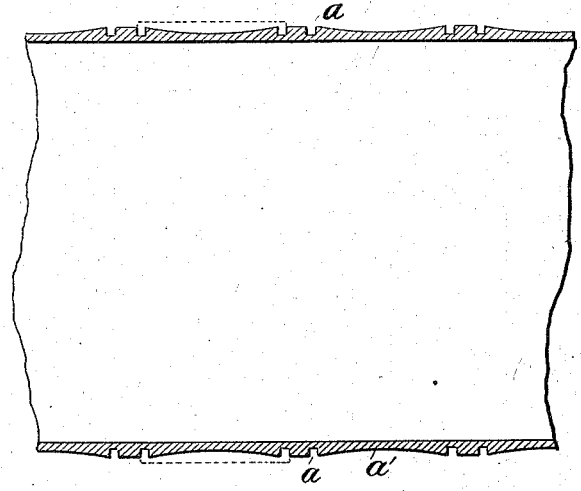
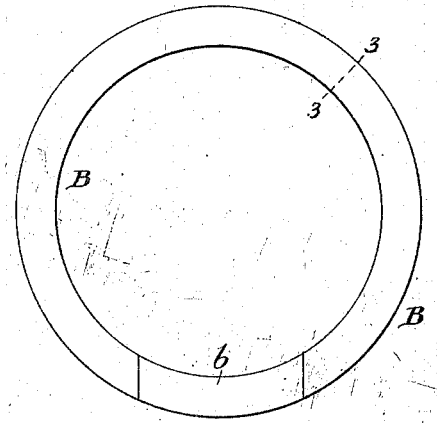
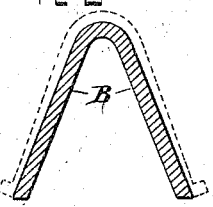
Attest:
Geo. T. Smallwood
Beuv Lewis
Inventor
Frederick W. Hardwick
by his attorneys

UNITED STATES PATENT OFFICE.

FREDERICK W. HARDWICK, OF PASSAIC, NEW JERSEY, ASSIGNOR TO THE NEW YORK BELTING AND PACKING COMPANY, LIMITED, OF GREAT BRITAIN.

PROCESS OF MANUFACTURING TIRES OR OTHER RUBBER GOODS.

SPECIFICATION forming part of Letters Patent No. 534,792, dated February 26, 1895.

Application filed June 1, 1893. Serial No. 476,229. (No model.)

*To all whom it may concern:*

Be it known that I, FREDERICK W. HARDWICK, of the city of Passaic, county of Passaic, and State of New Jersey, have invented a new and useful Improvement in Processes of Manufacturing Pneumatic Tires or other Rubber Goods, which is fully set forth in the following specification.

My invention relates more particularly to the manufacture of certain forms or styles of protecting bands or envelopes, designed to cover the inflation tubes of pneumatic tires. Such a tire, designed for use upon the wheels of bicycles, sulkies, buggies and other vehicles, is often composed of an interior tube, designed to be inflated with air, called the inflation tube, which sets upon the exterior of the felly or rim of the wheel, and of a protecting band or envelope, which covers the exterior and sides of the inflation tube, and which, together with the felly or rim, completely surrounds the inflation tube, the two edges of the cover being secured to the felly in different ways, for instance, by a flange on each edge of the cover, lodged in a groove or channel in the felly, adapted to receive a band of metallic wire to retain the flange securely in the groove or channel. The method of manufacture that I am now about to describe, while especially adapted to the manufacture of such covers, may also be used in the manufacture of other rubber goods. Such covers are made of one or more layers of rubber, or of fibrous material, coated with rubber, or of one or more layers of both rubber and fibrous material, and usually of the last mentioned. Such covers or envelopes are now ordinarily molded into their ultimate form and shape, by vulcanization under pressure in metallic molds. Such molds are very expensive. Among the objects of my invention are to dispense with these expensive molds, and to reduce the cost of manufacture.

The covers or envelopes are first formed in the shape of a flat band by methods well known in the art, and may be thickened, if desired, upon the tread portion of the tire or elsewhere. The covers should be provided with a beading or raised edging along the edges thereof, composed preferably of cores of duck coated with rubber, but a wire, or wire cable may also be used. Such cores may also be made of rubber, or other suitable material. These bands, having been cut to the proper length, are placed on cylindrical drums of iron, or other suitable material, provided with suitable grooves, into which the beadings or edgings approximately fit. These drums should preferably be of such a circumference, in cross-section, that the bands, when cut into proper size, will exactly surround the same, and the drums may be of such size that several bands may be placed side by side thereupon. These bands, when adjusted upon the drum, are then wrapped round and round, under great pressure, preferably with broad wet linen wrappers a sufficient number of times to prevent the same from slipping, and to sustain the pressure, say some twenty or thirty times. I do not, however, confine myself to wet linen. Any other suitable wrapper may be used. I do not limit myself in the size of the wrapper, nor to the number of times, that the wrapper should be wrapped around the band, nor to any particular method of obtaining, or sustaining the pressure, that is desirable. The bands, however, should preferably be subjected to a very heavy pressure. By adopting the method here described, the pressure upon the band will be increased by the drying of the linen, as will hereinafter appear. A metal clamp or clamps in some cases may also be used in place of the wrappers, or to supplement the same. The wrapping having been completed, the bands are then placed in a vulcanizer and subjected to the ordinary process of vulcanization, under the pressure of the wrappers. If wet linen wrappers are used, the shrinkage of the wrappers, incidental to the heating of the same, will tend to increase the pressure. I prefer that the bands should be removed, when the process of vulcanization is about half completed. I have found that a good result is produced by continuing this vulcanizing process for from thirty to forty minutes at a temperature of about 260° Fahrenheit. The process of vulcanization is then suspended, the wrappers are removed, and the bands are then placed upon hollow circular forms, shaped in cross-section like an inverted V with the point rounded, the rounded end being upon the exterior circumference of the form. The bands are fastened to these forms in any convenient way, and the curing, or vulcanization is then completed. I have found that a good result is produced by continuing and completing the process of vulcanization, for the same length of time and at the same temperature, as heretofore mentioned for the previous operation of partial vulcanization. The forms referred to are inexpensive, and may be made of iron, wood, or other suitable material. The ends of the covering or envelope having been already firmly united during the process of vulcanization, by methods which need not be described, as they are well known in the art, the covering or envelope now forms a complete circle, and is ready to be adjusted in position over the inflation tube, and secured to the rim of the wheel by means of wires, or slender bands of metal, or in any other convenient way. The covering will adapt itself to the shape of the inflation tube when inflated and practically used.

The drums, and the forms, referred to are both inexpensive, and their cost is insignificant, in comparison with that of the molds heretofore referred to. The results produced are better. The fabric is less liable to be burned than in the molds and is more flexible. The compression in the molds causes greater rigidity. The grooves, upon the drums may, of course, be omitted or varied to conform to the configuration of the band.

The particular configuration of the form, heretofore described is appropriate to covers of pneumatic tires, such as have already been described. The shape of the form, however, may be varied, depending upon the shape or configuration that is designed to be imparted to the article, or which the article is designed ultimately to assume.

Instead of completing the article by adjusting the band to the form, and completing the vulcanization upon the form, the vulcanization can be completed, and the band can be otherwise caused to assume the desired shape.

The entire process of vulcanization may, if desired, be completed without removing the article from the drum. The drum may be appropriately shaped so that its contour may tend to impart to the article the desired shape. Generally, however, I prefer the mode of procedure heretofore described.

The form above described may either be endless or may have a removable section to facilitate the removal of the cover therefrom.

The accompanying drawings will serve to illustrate my invention, in which—

Figure I is a longitudinal section of a portion of the drum upon which the preliminary steps in the formation of the tire are performed. Fig. II, is a side elevation of an annular former, and Fig. III is an enlarged section on the line III, of Fig. II.

In the drawings A represents the cylindrical drum around which the strips of which the tire-cover is to be formed are bent, their ends being connected in any suitable manner. These drums are preferably made of such length as to accommodate a series of strips arranged side by side. In the present instance I have shown a drum such as is used for the production of covers (indicated in dotted lines Fig. I) having a thickened tread portion and flanged edges, whereby the cover is held in place. In such cases suitable grooves $a$ are formed around the drum for the reception of the flanges, and the space between said grooves is concave as at $a'$ so as to conform to the thickened tread-portion; whereby the strip of which the cover is formed fits tightly in place, and irregularities in the formation of the cover prevented. After the cover is removed from the drum it is placed on an annular former B, preferably having a removable section $b$ to facilitate the withdrawal of the strip or cover from the former. The shape of the latter will, of course correspond to that which is to be imparted to the tire. As shown it has the shape in section of a capital V with a rounded point.

What I claim, and desire to secure by Letters Patent, is—

1. In the manufacture of covers or envelopes of pneumatic tires, and other rubber goods, the improvement which consists in wrapping or clamping the article upon a drum, partially vulcanizing the same under pressure, taking off the wrapper or clamp, removing the article from the drum, placing the same upon a form, and completing the vulcanization, substantially as described.

2. In the manufacture of covers or envelopes of pneumatic tires, and other rubber goods, the improvement which consists in wrapping or clamping the article upon a drum, partially vulcanizing the same under pressure, removing the pressure of the wrapping or clamping and completing the vulcanization, substantially as described.

3. In the manufacture of covers or envelopes of pneumatic tires, and other rubber goods, the improvement which consists in wrapping or clamping the article upon a drum, and vulcanizing the same under pressure, substantially as described.

4. In the manufacture of covers or envelopes of pneumatic tires, the improvement which consists in wrapping or clamping the article upon a drum under heavy pressure, partially vulcanizing the same under pressure, taking off the wrapper or clamp, removing the article from the drum, imparting thereto a shape in cross-section approximating a V with the end rounded, by placing it upon a suitable form and completing the vulcanization, substantially as described.

5. In the manufacture of covers or envelopes of pneumatic tires and other rubber goods, the improvement which consists in wrapping the article upon a drum, under heavy pressure with wrappings of textile fabric, and subjecting the same to the pressure caused thereby, in the process of vulcanization, substantially as described.

6. In the manufacture of covers or envelopes for pneumatic tires, the improvement consisting in imparting to the strip of which the cover or envelope is to be made a shape in cross-section approximating a V with the end rounded, and while maintaining the strip in this form, subjecting it to partial vulcanization, substantially as described.

7. A form for use in the manufacture of covers or envelopes of pneumatic tires, and analogous articles, said form having in cross-section an outline like the letter V with the point rounded, and being annular in shape and thereby adapted to distend and hold the cover or other article in the form of a ring, substantially as described.

In testimony whereof I have signed this specification in the presence of two subscribing witnesses.

FRED. W. HARDWICK.

Witnesses:
 HENRIETTA F. WAGNER,
 WILLIAM W. SCOTT.